(12) United States Patent
Sasing et al.

(10) Patent No.: US 12,072,185 B2
(45) Date of Patent: Aug. 27, 2024

(54) MAGNETIC TRACKING SYSTEMS AND METHODS OF DETERMINING POSITION AND ORIENTATION

(71) Applicant: Orthopaedic International, Inc., Laguna (PH)

(72) Inventors: Jude L. Sasing, Quezon (PH); Ramon B. Gustilo, Eden Prairie, MN (US)

(73) Assignee: Orthopaedic International, Inc., Laguna (PH)

( * ) Notice: Subject to any disclaimer, the term of this patent is extended or adjusted under 35 U.S.C. 154(b) by 387 days.

(21) Appl. No.: 17/506,157

(22) Filed: Oct. 20, 2021

(65) Prior Publication Data

US 2023/0122966 A1    Apr. 20, 2023

(51) Int. Cl.
*G01B 7/004*      (2006.01)
*G06F 3/0346*    (2013.01)
*H01F 7/06*       (2006.01)

(52) U.S. Cl.
CPC ........... *G01B 7/004* (2013.01); *G06F 3/0346* (2013.01); *H01F 7/064* (2013.01)

(58) Field of Classification Search
CPC .......... G01B 7/003; G01B 7/004; G01B 7/30; G06F 3/0346; H01F 7/064
See application file for complete search history.

(56) References Cited

U.S. PATENT DOCUMENTS

| | | |
|---|---|---|
| 4,054,881 A | 10/1977 | Raab |
| 4,287,809 A | 9/1981 | Egli et al. |
| 4,314,251 A | 2/1982 | Raab |
| 4,396,885 A | 8/1983 | Constant |
| 4,849,692 A | 7/1989 | Blood |
| 4,945,305 A | 7/1990 | Blood |
| 6,073,043 A | 6/2000 | Schneider |
| 7,193,556 B1 * | 3/2007 | Pereira ...................... F41G 7/34 |
| | | 342/61 |

(Continued)

FOREIGN PATENT DOCUMENTS

WO     2021161158 A1    8/2021

OTHER PUBLICATIONS

International Search Report and Written Opinion for co-pending PCT/US2022/046759, 21 pages, Feb. 23, 2023.

*Primary Examiner* — Timothy X Pham
(74) *Attorney, Agent, or Firm* — Kagan Binder, PLLC

(57) ABSTRACT

A magnetic tracking system for determining position and orientation of an object in three-dimensional space, the system including an electromagnet assembly including first and second electromagnets that are coaxial, non-coincident, and spaced from each other by a fixed distance, at least one magnetometer positioned at a movable location relative to the electromagnet assembly and configured to measure three orthogonal components of a magnetic field vector, and a microcontroller unit operably connected to the at least one magnetometer. The microcontroller unit is configured to control measurement of magnetic fields by the at least one magnetometer and compute a relative position and orientation of the electromagnet assembly and the at least one magnetometer in five degrees of freedom using at least two equations with two unknowns and coordinate transformation equations relating the coordinate frames of the electromagnet assembly and the at least one magnetometer.

17 Claims, 3 Drawing Sheets

(56) References Cited

U.S. PATENT DOCUMENTS

| | | |
|---|---|---|
| 10,551,916 B2 | 2/2020 | Chen et al. |
| 10,884,505 B1 | 1/2021 | Huo et al. |
| 11,543,529 B1 * | 1/2023 | Higgins ................ G06F 3/0346 |
| 2007/0135804 A1 | 6/2007 | Ritter et al. |
| 2007/0167703 A1 | 7/2007 | Sherman et al. |
| 2011/0082366 A1 | 4/2011 | Scully et al. |
| 2017/0090003 A1 | 3/2017 | Guo |
| 2019/0285766 A1 | 9/2019 | Miles et al. |
| 2023/0036210 A1 * | 2/2023 | Higgins ................... G01B 7/30 |

* cited by examiner

MAGNETIC TRACKING SYSTEMS AND METHODS OF DETERMINING POSITION AND ORIENTATION

TECHNICAL FIELD

The present invention relates to positional tracking systems, and in particular to a device and computational method for tracking the position and orientation of an object in 3-dimensional space using electromagnets and magnetic sensors.

BACKGROUND

Tracking of positions of objects in 3-dimensional (3D) space has many applications in various areas including virtual reality, weapons guidance, biomechanics, and medicine. Different devices and techniques for tracking object position and orientation have been proposed and implemented. These devices may use mechanical, optical, inertial, or magnetic tracking techniques. Each technique has advantages and disadvantages. The systems and methods described herein relate to magnetic tracking techniques. Magnetic tracking has the advantage of not needing a line of sight or a physical connection between the object being tracked and the tracking device. Many devices and techniques have been developed for tracking objects using magnetic fields.

One method used in magnetic tracking makes use of Faraday's Law of Electromagnetic Induction. An emitter device driven by an alternating current source comprises a plurality of electromagnets that emit alternating magnetic fields (i.e., emitter coils). A similar but usually smaller coil or set of coils is used as a receiver device (i.e., receiver coils). Through electromagnetic induction, a voltage is typically generated in each of the receiver coils. The magnitudes of these voltages are related to the position and orientation of a receiver coil relative to an emitter coil. The magnitudes of the voltages from the different receiver coils are used to compute the 3D position and orientation of the receiver device relative to the emitter device. Examples of patents using alternating magnetic fields include U.S. Pat. No. 4,054,881 issued to Raab, U.S. Pat. No. 4,287,809 issued to Egli, et. al., U.S. Pat. No. 4,314,251 issued to Raab, and U.S. Pat. No. 4,396,885 issued to Constant.

One disadvantage of using alternating magnetic fields for position and orientation tracking is that they generate eddy currents in nearby metallic objects which distort the magnetic fields resulting in errors in the computed position and orientation values. In order to solve the problem with eddy currents, a number of patents describe the use of pulsed direct current (DC) magnetic fields, such as U.S. Pat. No. 4,849,692 issued to Blood. Using pulsed DC magnetic fields, eddy currents can still appear at the start and end of each pulse cycle. However, magnetic field measurements can be taken after sufficient time has elapsed for the eddy currents to die down, which thereby reduces the frequency at which measurements can be taken. U.S. Pat. No. 4,945,305 issued to Blood teaches about methods of reducing errors due to eddy currents if measurements need to be taken at a faster rate.

Existing magnetic tracking devices, whether using AC or pulsed DC magnetic fields, require the use of complicated non-linear equations with several unknowns in order to determine the position and orientation of the receiver device. U.S. Pat. No. 6,073,043 issued to Schneider describes different combinations and configurations of emitter and sensor elements and corresponding systems of equations for determining position and orientation. At the minimum, 5 simultaneous non-linear equations with 5 unknowns need to be solved. This requires the use of sophisticated algorithms that take time to solve and need a fast processor computing speed, especially if multiple objects are to be tracked simultaneously.

U.S. Pat. No. 10,551,916 B2 issued to Chen, et. al. describes a magnetic tracking device that uses trilateration to determine 3D position. The object to be tracked in this case is an electromagnet. A set of four 3-axis magnetometers with known positions and orientations relative to each other is used as a reference frame from which the position of the electromagnet is tracked. The device measures the strength of the magnetic field emitted by the electromagnet from each of the magnetometers and relates these to the distance of the electromagnet from each magnetometer. Using the distances of the electromagnet from the four magnetometers, the location (x, y, and z coordinates) of the electromagnet is computed from four non-linear equations with three unknowns. Although multiple electromagnets can be tracked simultaneously with this tracking device, a disadvantage of this device is that only the position of the electromagnet can be determined, but not its orientation. In order to track orientation, the invention requires additional data from inertial measurement sensors such as accelerometers and gyroscopes attached to the electromagnet to be tracked.

Electromagnetic tracking is known generally in the art. However, equations for determining position and orientation for existing devices are complicated and difficult to solve, which therefore require significant computing power and/or computing time. The systems and methods described herein address this problem by using an approach that results in a simpler set of equations that can be solved quickly, thereby requiring less computing power and making electromagnetic tracking easier and inexpensive to implement.

SUMMARY

The basic components of the present invention include two coaxial but non-coincident electromagnets and a 3-axis magnetometer. Since the electromagnets are coaxial and spaced apart, their magnetic field lines are coplanar at points away from the common axis, for example, at the location of the magnetometer. This reduces the 3-dimensional (3D) position and orientation problem into a 2-dimensional (2D) problem. Using equations for the magnetic field strength and the magnetic field direction, the relative position between the magnetometer and the two electromagnets can be solved with only two equations and two unknowns. The solution is a partial, 2D solution in the plane containing the common axis of the electromagnets and the magnetometer. To determine 3D position and orientation, the plane containing the common axis is identified from the directions of the magnetic field lines emanating from the two electromagnets. This allows the determination of position and orientation in 5 degrees of freedom (DOF). To solve position and orientation in 6 DOF, a third electromagnet is added to provide additional data to determine azimuthal angle about the common axis of the electromagnets. Alternatively, a 6 DOF solution can be obtained by combining two 5 DOF systems in one assembly.

In an aspect of the invention, a magnetic tracking system is described for determining position and orientation of an object in three-dimensional space, the system including an electromagnet assembly comprising first and second electromagnets that are coaxial, non-coincident, and spaced from each other by a fixed distance, at least one magnetometer positioned at a movable location relative to the electromagnet assembly and configured to measure three orthogonal components of a magnetic field vector, and a microcontroller unit operably connected to the at least one magnetometer. The microcontroller unit is configured to control measurement of magnetic fields by the at least one magnetometer and compute a relative position and orientation of the electromagnet assembly and the at least one magnetometer in five degrees of freedom using at least two equations with two unknowns and coordinate transformation equations relating the coordinate frames of the electromagnet assembly and the at least one magnetometer.

According to systems described herein, the microcontroller unit may be configured to relate the coordinate frames of the electromagnet assembly and the magnetometer through a plane defined by first and second magnetic field vectors emanating from the first and second electromagnets, respectively. The electromagnet assembly may further include a third electromagnet comprising an axis that is perpendicular to a common axis along which the first and second electromagnets are spaced from each other. When the system includes such a third electromagnet, the microcontroller unit may be configured to compute the relative position and orientation of the electromagnet assembly and the magnetometer in six degrees of freedom using at least two equations with two unknowns and coordinate transformation equations relating the coordinate frames of the electromagnet assembly and the magnetometer.

Further according to systems described herein, the microcontroller unit may be configured to compute the relative position and orientation of the electromagnet assembly and the at least one magnetometer in five degrees of freedom using exactly two equations with two unknowns and coordinate transformation equations relating the coordinate frames of the electromagnet assembly and the at least one magnetometer. In addition, at least one magnetometer may be a three-axis magnetometer, the microcontroller unit may be further operably connected to the electromagnet assembly, and the microcontroller unit may be further configured to control activation of the first and second electromagnets. The system may also include a secondary microcontroller unit configured to control activation of the first and second electromagnets.

In an aspect of the invention, a method is described for determining position and orientation of an object in three-dimensional space. The method includes the steps of: activating first and second electromagnets of an electromagnet assembly, wherein the first and second electromagnets are coaxial, non-coincident, and spaced from each other by a fixed distance; positioning at least one magnetometer at a movable location relative to the electromagnet assembly; measuring three orthogonal components of a magnetic field vector with the at least one magnetometer; and computing the relative position and orientation of the electromagnet assembly and the at least one magnetometer in five degrees of freedom using at least two equations with two unknowns and coordinate transformation equations relating the coordinate frames of the electromagnet assembly and the at least one magnetometer. The step of computing is performed by a microcontroller unit operably connected to the at least one magnetometer, wherein the microcontroller unit controls the measurement of magnetic field vectors by the at least one magnetometer.

According to methods described herein: the step of computing may be performed by a microcontroller unit that is further operably connected to the electromagnet assembly; the step of computing may be performed by a microcontroller that further controls the activation of the first and second electromagnets; the step of activating the first and second electromagnets may include sequentially activating the first and second electromagnets; the step of activating the first and second electromagnets may include isolating and distinguishing a first and second magnetic field from the first and second electromagnets, respectively; and/or the computing step may further include using equations for magnetic field strength and magnetic field direction to determine the relative position between the magnetometer and the two electromagnets with exactly two equations and two unknowns. The computing step may provide a partial, 2D solution in a plane containing a common axis of the first and second electromagnets and the magnetometer.

In an aspect of the invention, a method is described for determining position and orientation in five degrees of freedom for an electromagnet assembly relative to a magnetometer spaced from the electromagnet assembly, wherein the electromagnet assembly comprises first and second electromagnets spaced from each other along a common axis, wherein a center of the magnetometer is spaced at a first distance from the first electromagnet and spaced at a second distance from the second electromagnet, and wherein the magnetometer is configured to measure magnetic field strength in three orthogonal directions. The method includes the steps of: computing a magnitude of a first magnetic field vector at the center of the magnetometer; determining a direction of the first magnetic field vector at the center of the magnetometer, wherein the direction of the first magnetic field vector is represented as:

$$\alpha_1 = \cos^{-1}\frac{2\cos\theta_1}{\sqrt{1+3\cos^2\theta_1}}$$

where $\theta_1$ is a first colatitude angle between the common axis extending from the first electromagnet and a first line extending from the first electromagnet to the center of the magnetometer; computing a magnitude of a second magnetic field vector at the center of the magnetometer; determining a direction of the second magnetic field vector at the center of the magnetometer, wherein the direction of the second magnetic field vector is represented as:

$$\alpha_2 = \cos^{-1}\frac{2\cos\theta_2}{\sqrt{1+3\cos^2\theta_2}}$$

where $\theta_2$ is a second colatitude angle between the common axis extending from the second electromagnet and a second line extending from the second electromagnet to the center of the magnetometer; computing the angle between the first magnetic field vector and the second magnetic field vector, the angle being represented as:

$$\alpha_d = \cos^{-1}\frac{\vec{B_1}\cdot\vec{B_2}}{B_1 B_2}$$

where $B_1$ is the magnitude of the first magnetic field vector and $B_2$ is the magnitude of the second magnetic field vector; solving the following first and second equations as a system of two non-linear equations with unknowns $\theta_1$ and $\theta_2$:

$$f(\theta_1, \theta_2) = \sin^3\theta_1\sqrt{1+3\cos^2\theta_1} - \frac{B1}{B2}\sin^3\theta_2\sqrt{1+3\cos^2\theta_2} = 0, \text{ and}$$

$$g(\theta_1, \theta_2) = \cos^{-1}\frac{2\cos\theta_1}{\sqrt{1+3\cos^2\theta_1}} - \cos^{-1}\frac{2\cos\theta_2}{\sqrt{1+3\cos^2\theta_2}} + \theta_1 - \theta_2 - \alpha_d = 0;$$

and determining a 3D position and orientation of the electromagnet assembly by identifying a plane containing the common axis from the directions of magnetic field lines emanating from the first and second electromagnets.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Figure 1:
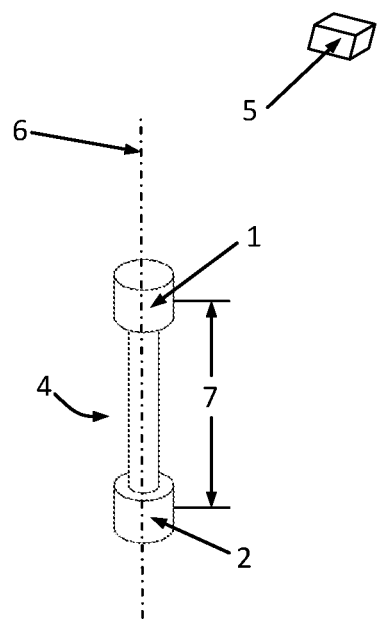
FIG. 1 is a perspective view of one embodiment of an electromagnet assembly spaced from a magnetometer, in accordance with the systems and methods described herein.

Referring now to the Figures, wherein the components are labeled with like numerals throughout the several Figures, and initially to FIG. 1, a perspective view of one embodiment of the present invention is shown. An electromagnet assembly (EMA) 4 is composed of two electromagnets, electromagnet (EM) 1 and electromagnet (EM) 2, oriented to be coaxial along axis 6 and spaced apart by a known fixed distance 7. Magnetometer (MM) 5 is a 3-axis magnetometer that can measure magnetic field strength in three orthogonal directions. MM 5 can therefore measure both the magnitude and direction of the magnetic field vector. MM 5 is preferably a magnetoresistive type of magnetometer, although it can also be of a different type such as a Hall Effect or a search-coil type magnetometer, for example. EM 1 and EM 2 can be activated using standard AC or DC techniques so that their respective magnetic fields can be isolated and measured separately by MM 5. The objective is to determine the position and orientation of EMA 4 and the MM 5 relative to each other.

In general and according to aspects of the systems and methods described herein, a microcontroller unit (not illustrated) is provided that is configured to control measurement of magnetic fields by the magnetometer(s) and compute a relative position and orientation of the electromagnet assembly and the magnetometer(s) in five degrees of freedom using at least two equations with two unknowns and coordinate transformation equations relating the coordinate frames of the electromagnet assembly and the magnetometer(s). The microcontroller unit may be further configured to control activation of the first and second electromagnets. The system may also include a secondary microcontroller unit configured to control activation of the first and second electromagnets.

EM 1 and EM 2 are identical in some embodiments, but they can instead have different properties. In the equations that follow, EM 1 and EM 2 are assumed to be magnetic dipoles. This simplifies the equations, and is valid for distances much larger than the radii of the electromagnets. Since the magnetic fields of EM 1 and EM 2 are axisymmetric, they can be represented and analyzed on a 2D coordinate frame containing the common axis 6.

Figure 2:
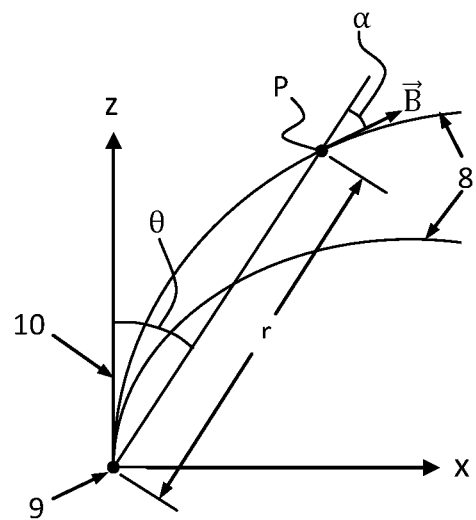
FIG. 2 is schematic view of an exemplary magnetic dipole and its magnetic field lines.
Figure 3:
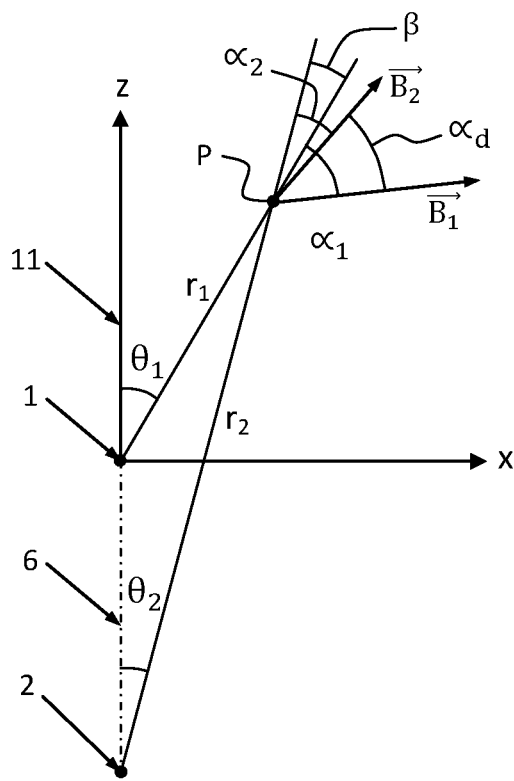
FIG. 3 is a schematic view of an electromagnet assembly and a magnetometer.

FIG. 2 shows a 2D representation of magnetic field lines 8 emanating from a magnetic dipole 9 at the origin of coordinate frame 10. Equations describing the magnitude and direction of the magnetic field vector $\vec{B}$ of a magnetic dipole are available in the art. The magnitude of the magnetic field $\vec{B}$ at a point P can be computed from equation (1) below, with reference to FIG. 2.

$$B = \frac{\mu_o M \sqrt{1+3\cos^2\theta}}{r^3} \quad (1)$$

where: B=magnitude of the B-field at point P
$\mu_0$=permeability of free space
M=magnitude of the dipole moment
$\theta$=colatitude (or polar) angle of point P
r=distance of point P from the origin The direction of the magnetic field vector at point P can be determined from equation (2) below.

$$\alpha = \cos^{-1}\frac{2\cos\theta}{\sqrt{1+3\cos^2\theta}} \quad (2)$$

where: $\alpha$=angle between the radial direction (from dipole 9 to point P) and the magnetic field vector $\vec{B}$ FIG. 3 shows a 2D schematic representation of EMA 4 attached to 2D coordinate frame 11 with the z-axis collinear with axis 6 and the origin at the center of EM 1. Point P is at the center of MM 5, located at an arbitrary and/or movable location relative to coordinate frame 11. The following equations (3) through (6) are derived by applying equations (1) and (2) to the magnetic fields emanating from EM 1 and EM 2, measured at point P, $$B_1 = \frac{\mu_o M_2 \sqrt{1+3\cos^2\theta_1}}{r_1^3} \quad (3)$$

$$B_2 = \frac{\mu_o M_3 \sqrt{1+3\cos^2\theta_2}}{r_2^3} \quad (4)$$

$$\alpha_1 = \cos^{-1}\frac{2\cos\theta_1}{\sqrt{1+3\cos^2\theta_1}} \quad (5)$$

$$\alpha_2 = \cos^{-1}\frac{2\cos\theta_2}{\sqrt{1+3\cos^2\theta_2}} \quad (6)$$

where the subscripts 1 and 2 refer to EM 1 and EM 2, respectively.

Combining equations 3 and 4 gives:

$$\frac{B_1}{B_2} = \frac{M_1 r_2^3 \sqrt{1+3\cos^2\theta_1}}{M_2 r_1^3 \sqrt{1+3\cos^2\theta_2}} \quad (7)$$

In circumstances where EM 1 and EM 2 have identical properties with equal energizing currents, $M_1$ and $M_2$ cancel out and (7) simplifies to $$\frac{B_1}{B_2} = \frac{r_2^3 \sqrt{1 + 3\cos^2\theta_1}}{r_1^3 \sqrt{1 + 3\cos^2\theta_2}} \tag{8}$$

Alternatively, if EM 1 and EM 2 are not identical, a correction factor equal to the ratio $M_1/M_2$ can be used.

From FIG. 3, it can be seen that $$\frac{r_2}{r_1} = \frac{\sin\theta_1}{\sin\theta_2} \tag{9}$$

Substituting (9) into (8) gives $$\frac{B_1}{B_2} = \frac{\sin^3\theta_1 \sqrt{1 + 3\cos^2\theta_1}}{\sin^3\theta_2 \sqrt{1 + 3\cos^2\theta_2}} \tag{10}$$

$$B_r = \frac{\sin^3\theta_1 \sqrt{1 + 3\cos^2\theta_1}}{\sin^3\theta_2 \sqrt{1 + 3\cos^2\theta_2}} \tag{11}$$

where: $B_r = \frac{B_1}{B_2}$

Vector magnitudes $B_1$ and $B_2$ can be determined from the orthogonal components of the magnetic fields measured by MM 5.

Referring again to FIG. 3, the following equations (12) and (13) are derived.

$$\alpha_1 + \beta - \alpha_2 = \alpha_d \tag{12}$$

where: $\alpha_d$=angle between vectors $\vec{B_1}$ and $\vec{B_2}$ $$\beta = \theta_1 - \theta_2 \tag{13}$$

Angle $\alpha_d$ can be computed from the dot product of vectors $\vec{B_1}$ and $\vec{B_2}$ as shown in equation (14) below:

$$\alpha_d = \cos^{-1} \frac{\vec{B_1} \cdot \vec{B_2}}{B_1 B_2} \tag{14}$$

where: $B_1$=Magnitude of vector $\vec{B_1}$ $B_2$=Magnitude of vector $\vec{B_2}$ The dot product of vectors $\vec{B_1}$ and $\vec{B_2}$ can be computed using the orthogonal components of vectors $\vec{B_1}$ and $\vec{B_2}$ measured by MM 5.

Substituting equations (5), (6), and (13) into equation (12) gives $$\cos^{-1} \frac{2\cos\theta_1}{\sqrt{1 + 3\cos^2\theta_1}} - \cos^{-1} \frac{2\cos\theta_2}{\sqrt{1 + 3\cos^2\theta_2}} + \theta_1 - \theta_2 = \alpha_d \tag{15}$$

Equations (11) and (15) can be rearranged into the following equations (16) and (17).

$$f(\theta_1, \theta_2) = \sin^3\theta_1 \sqrt{1 + 3\cos^2\theta_1} - B_r \sin^3\theta_2 \sqrt{1 + 3\cos^2\theta_2} = 0 \tag{16}$$

$$g(\theta_1, \theta_2) = \tag{17}$$
$$\cos^{-1} \frac{2\cos\theta_1}{\sqrt{1 + 3\cos^2\theta_1}} - \cos^{-1} \frac{2\cos\theta_2}{\sqrt{1 + 3\cos^2\theta_2}} + \theta_1 - \theta_2 - \alpha_d = 0$$

Equations (16) and (17) can then be solved as a system of two non-linear equations with two unknowns ($\theta_1$ and $\theta_2$). This can be performed, for example, by Newton's Method, or by other methods known to one skilled in the art. The solution to equations (16) and (17) converge quickly and can be easily implemented in a computer program. Once $\theta_1$ and $\theta_2$ are solved, the other variables can be determined. The x and z coordinates of point P can be determined from $\theta_1$ and $r_1$ or $\theta_2$ and $r_2$.

Figure 4:
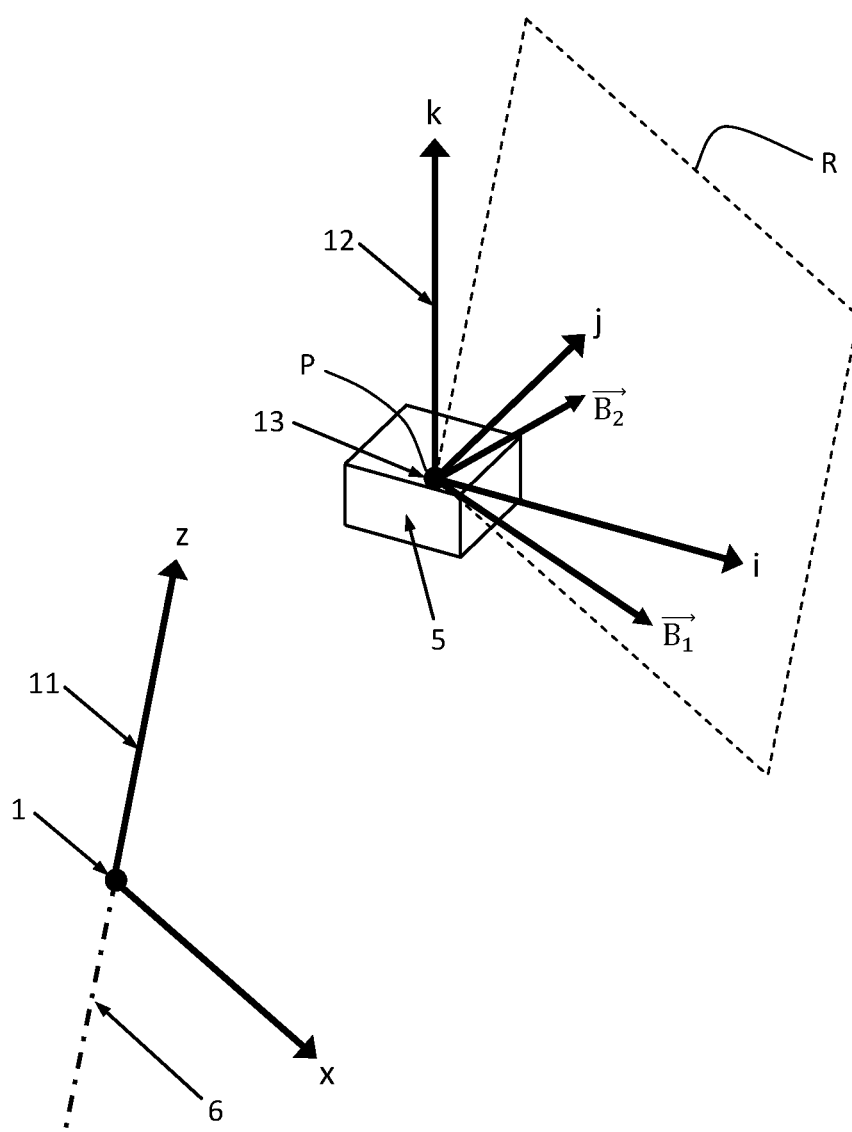
FIG. 4 is another schematic view of an electromagnet assembly and a magnetometer.

The above solution determines the location of MM 5 relative to EMA 4 in 2D. To determine 3D position and orientation, it is necessary to determine the orientation of coordinate frame 11 (x-z plane of FIG. 3) relative to MM 5. This can be done using the directions of vectors $\vec{B_1}$ and $\vec{B_2}$. FIG. 4 shows coordinate frame 12 which is attached to MM 5. The i, j and k axes are coincident with the measuring axes of MM 5. The origin 13 of coordinate frame 12 coincides with the center of MM 5 and point P from which the two vectors $\vec{B_1}$ and $\vec{B_2}$ are measured.

Since the magnetic fields of both EM 1 and EM 2 are axisymmetric along axis 6, vectors $\vec{B_1}$ and $\vec{B_2}$ (measured at the same point) are always on the same plane and both are coplanar with axis 6. Since EM 1 and EM 2 are coaxial but spaced a distance apart, vectors $\vec{B_1}$ and $\vec{B_2}$ will not be collinear except at points along axis 6. The directions of the two vectors can therefore be used to define the plane R containing coordinate frame 11 in FIG. 4, except when point P is located along axis 6. In practice, errors increase as point P gets near axis 6. However, for many applications, tracking needs to be done only within a specific volume which can be sufficiently far from axis 6. The directions of vectors $\vec{B_1}$ and $\vec{B_2}$ can be determined from the orthogonal components of the magnetic field measured by MM 5 for each vector.

Using the solved values of the x and z coordinates of point P relative to coordinate frame 11 and the magnitudes of the orthogonal components of vectors $\vec{B_1}$ and $\vec{B_2}$, measured from coordinate frame 12, transformation equations can be used to relate the position and orientation of coordinate frames 11 and 12 relative to each other. Different combinations of rotation and translation equations may be used depending on the preferred order of rotation and translation to be done.

After the translation and rotation equations are applied, the i, j, and k coordinates of the origin of coordinate frame 11 relative to coordinate frame 12 can be determined. The orientation (roll and pitch) of axis 6 can also be determined. This provides a 5 DOF solution for the position and orientation of EMA 4 relative to MM 5. Since the magnetic field of EMA 4 is axisymmetric, it is not possible to determine the yaw of EMA 4 around axis 6. The magnitudes and directions of vectors $\vec{B_1}$ and $\vec{B_2}$ are axisymmetric about axis 6 and will not change regardless of the azimuthal angle of MM 5 around axis 6. Thus, only 5 DOF can be determined.

Figure 5:
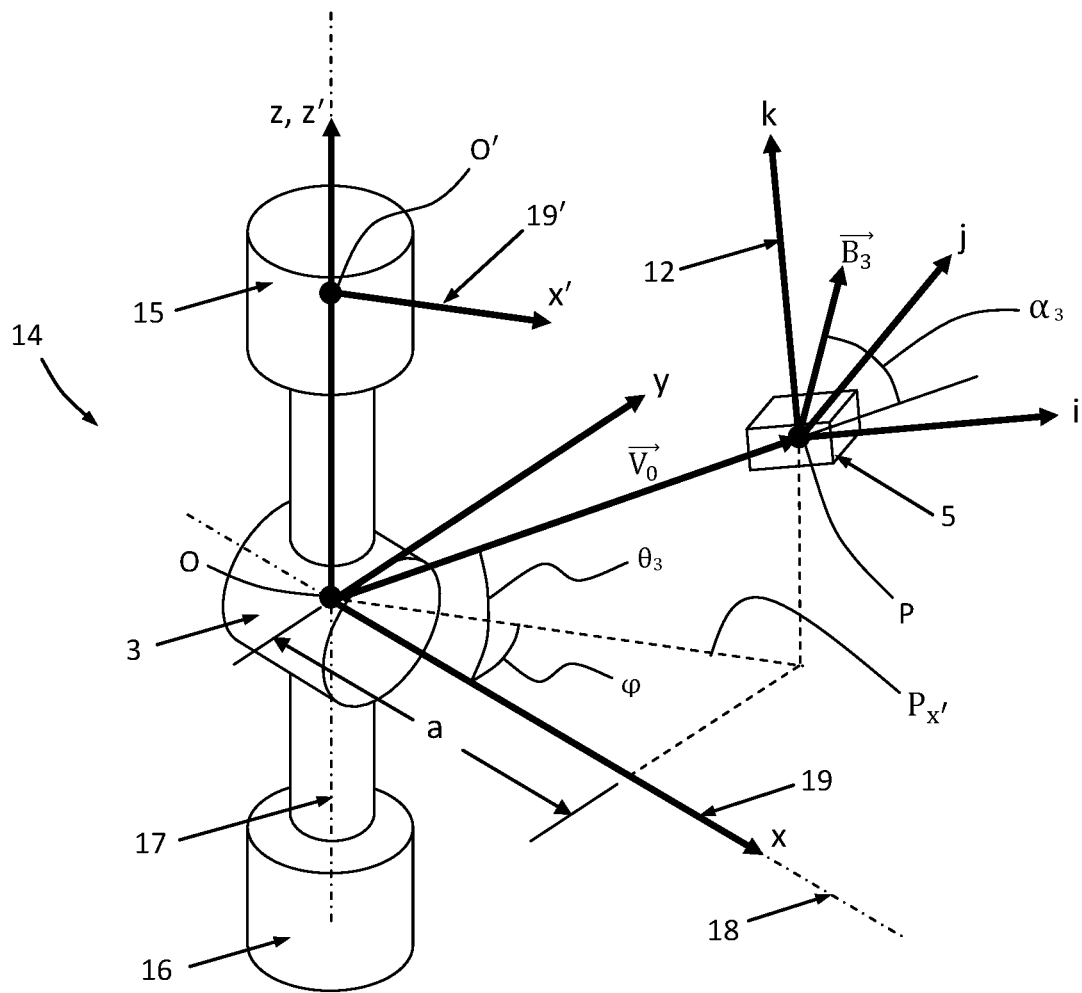
FIG. 5 is a perspective view of another embodiment of an electromagnet assembly spaced from a magnetometer, in accordance with the systems and methods described herein.

In another embodiment of the present invention, a third electromagnet is added to EMA 4 to provide data needed to determine position and orientation in 6 DOF. FIG. 5 shows EMA 14 which is similar to EMA 4 but additionally includes a third electromagnet. EMA 14 has two coaxial electromagnets EM 15 and EM 16, spaced apart by a known distance along axis 17. A third electromagnet EM 3 is positioned along axis 17 at a known distance from EM 15, such as halfway between EM 15 and EM 16, for example. The axis 18 of EM 3 is oriented orthogonal to axis 17. Coordinate frame 19 is defined as having its origin O at the center of EM 3 with the z-axis collinear with axis 17, and the x-axis collinear with axis 18. Also shown in FIG. 5 is MM 5 with coordinate frame 12 whose origin is coincident with point P with an azimuth angle φ relative to axis x. Coordinate frame 19' is a 2D coordinate frame with its origin O' at the center of EM 15 and the z'-axis collinear with axis 17. The orientation of axis x' is such that it is coplanar with both point P and axis z'.

EM 15 and EM 16 are identical in some embodiments but they can instead have different properties. EM 15, EM 16, and EM 3 can be activated by AC or DC techniques to isolate and measure their respective magnetic fields. The purpose of EM 3 is to provide information to determine the azimuthal angle φ of point P relative to coordinate frame 19. In this embodiment, coordinate frame 19, together with EMA 14, is fixed and coordinate frame 12, together with MM 5, is moving and tracked relative to coordinate frame 19. One advantage of this configuration for determining 6 DOF position and orientation is that MM5 can be very small, in the order of 1 mm, for example, so that it can be attached to the object to be tracked without being obtrusive. Another advantage of this configuration is that multiple magnetometers can be tracked simultaneously using the same magnetic fields from EM 15, EM16, and EM 3, and the same equations used for tracking MM5 applied to each magnetometer. Alternatively, MM5 and coordinate frame 12 can be fixed and coordinate frame 19, together with EMA 14, is moving and tracked relative to coordinate frame 12.

Referring again to FIG. 5, Vector $\vec{B_3}$ is the magnetic field vector emanating from EM 3, at point P. Vector $\vec{V_0}$ is the vector from origin O to point P. From FIG. 5, equations (18) and (19) can be derived.

$$a = V_0 \cos\theta_3 \quad (18)$$

$$a = P_{x'} \cos\varphi \quad (19)$$

where: $V_0$=magnitude of vector $\vec{V_0}$
$\theta_3$=colatitude angle of point P relative to axis 18
$P_{x'}$=x' coordinate of point P relative to coordinate frame 19'
φ=azimuthal angle of point P relative to the x-axis of coordinate frame 19

Combining equations (18) and (19) provides the following equation (20):

$$\cos\varphi = \frac{V_0 \cos\theta_3}{P'_x} \quad (20)$$

Applying equation (2) to $\vec{B_3}$ provides the following equation (21):

$$\cos\alpha_3 = \frac{2\cos\theta_3}{\sqrt{1 + 3\cos^2\theta_3}} \quad (21)$$

where: $\alpha_3$=angle between vectors $\vec{V_0}$ and $\vec{B_3}$

With some trigonometric manipulation, equation (21) can be transformed into equation (22).

$$\cos\theta_3 = \frac{\cos\alpha_3}{\sqrt{4 - 3\cos^2\alpha_3}} \quad (22)$$

Substituting equation (22) into equation (20) provides the following equations (23) and (24):

$$\cos\varphi = \frac{V_0 \cos\alpha_3}{P'_x \sqrt{4 - 3\cos^2\alpha_3}} \quad (23)$$

$$\varphi = \cos^{-1} \frac{V_0 \cos\alpha_3}{P'_x \sqrt{4 - 3\cos^2\alpha_3}} \quad (24)$$

The value of $\cos\alpha_3$ can be computed from the dot product of $\vec{V_0}$ and $\vec{B_3}$ and the magnitudes of $\vec{V_0}$ and $\vec{B_3}$. The dot product of vectors $\vec{V_0}$ and $\vec{B_3}$ can be computed from the orthogonal components of $\vec{V_0}$ and $\vec{B_3}$. The components of vector $\vec{B_3}$ can be derived from the measurements of MM 5 while the components of $\vec{V_0}$ can be derived from the x' and z' coordinates of point P relative to coordinate frame 19'. The components can be transformed to a common coordinate frame by applying appropriate transformation equations to $\vec{V_0}$ and/or $\vec{B_3}$ before evaluating the dot product. The magnitudes of $\vec{V_0}$ and $\vec{B_3}$, on the other hand, can be computed from their corresponding components relative to any coordinate frame. The azimuthal angle φ can now be computed from equation (24). Once the azimuthal angle is determined, the position and orientation of coordinate frame 12 relative to coordinate frame 19 can be determined in 6 DOF (x, y, and z coordinates, and pitch, roll, and yaw).

In another embodiment for a 6 DOF system, two 5 DOF electromagnet assemblies are combined such that their respective common axes are perpendicular to each other. This configuration can be used to determine azimuthal orientation to provide a 6 DOF solution for position and orientation.

The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein.

What is claimed is:

1. A magnetic tracking system for determining position and orientation of an (Original) object in three-dimensional space, comprising:
   an electromagnet assembly comprising first and second electromagnets that are coaxial, non-coincident, and spaced from each other by a fixed distance;
   at least one magnetometer positioned at a movable location relative to the electromagnet assembly and configured to measure three orthogonal components of a magnetic field vector; and a microcontroller unit operably connected to the at least one magnetometer, wherein the microcontroller unit is configured to:
control measurement of magnetic fields by the at least one magnetometer; and
compute a relative position and orientation of the electromagnet assembly and the at least one magnetometer in five degrees of freedom using at least two equations with two unknowns and coordinate transformation equations relating the coordinate frames of the electromagnet assembly and the at least one magnetometer.

2. The system of claim 1, wherein the microcontroller unit is configured to relate the coordinate frames of the electromagnet assembly and the magnetometer through a plane defined by first and second magnetic field vectors emanating from the first and second electromagnets, respectively.

3. The system of claim 1, wherein the electromagnet assembly further comprises a third electromagnet comprising an axis that is perpendicular to a common axis along which the first and second electromagnets are spaced from each other.

4. The system of claim 3, wherein the microcontroller unit is configured to compute the relative position and orientation of the electromagnet assembly and the magnetometer in six degrees of freedom using at least two equations with two unknowns and coordinate transformation equations relating the coordinate frames of the electromagnet assembly and the magnetometer.

5. The system of claim 1, wherein the microcontroller unit is configured to compute the relative position and orientation of the electromagnet assembly and the at least one magnetometer in five degrees of freedom using exactly two equations with two unknowns and coordinate transformation equations relating the coordinate frames of the electromagnet assembly and the at least one magnetometer.

6. The system of claim 1, wherein the at least one magnetometer comprises at least one three-axis magnetometer.

7. The system of claim 1, wherein the microcontroller unit is further operably connected to the electromagnet assembly.

8. The system of claim 1, wherein the microcontroller unit is further configured to control activation of the first and second electromagnets.

9. The system of claim 1, further comprising a secondary microcontroller unit configured to control activation of the first and second electromagnets.

10. A method of determining position and orientation of an object in three-dimensional space, comprising the steps of:
activating first and second electromagnets of an electromagnet assembly, wherein the first and second electromagnets are coaxial, non-coincident, and spaced from each other by a fixed distance;
positioning at least one magnetometer at a movable location relative to the electromagnet assembly;
measuring three orthogonal components of a magnetic field vector with the at least one magnetometer; and
computing the relative position and orientation of the electromagnet assembly and the at least one magnetometer in five degrees of freedom using at least two equations with two unknowns and coordinate transformation equations relating the coordinate frames of the electromagnet assembly and the at least one magnetometer;
wherein the step of computing is performed by a microcontroller unit operably connected the at least one magnetometer, and wherein the microcontroller unit controls the measurement of magnetic field vectors by the at least one magnetometer.

11. The method of claim 10, wherein the step of computing is performed by a microcontroller unit that is further operably connected to the electromagnet assembly.

12. The method of claim 10, wherein the step of computing is performed by a microcontroller that further controls the activation of the first and second electromagnets.

13. The method of claim 10, wherein the step of activating the first and second electromagnets comprises sequentially activating the first and second electromagnets.

14. The method of claim 10, wherein the step of activating the first and second electromagnets comprises isolating and distinguishing a first and second magnetic field from the first and second electromagnets, respectively.

15. The method of claim 10, wherein the computing step further comprises using equations for magnetic field strength and magnetic field direction to determine the relative position between the magnetometer and the two electromagnets with exactly two equations and two unknowns.

16. The method of claim 15, wherein the computing step provides a partial, 2D solution in a plane containing a common axis of the first and second electromagnets and the magnetometer.

17. A method of determining position and orientation of an object in three-dimensional space, comprising the steps of:
activating first, second and third electromagnets of an electromagnet assembly, wherein the first and second electromagnets are coaxial, non-coincident, and spaced from each other by a fixed distance, and the third electromagnet is oriented with its axis orthogonal to the common axis of the first and second electromagnets;
positioning at least one magnetometer at a movable location relative to the electromagnet assembly;
measuring three orthogonal components of a magnetic field vector with the at least one magnetometer; and
computing the relative position and orientation of the electromagnet assembly and the at least one magnetometer in six degrees of freedom using at least two equations with two unknowns and coordinate transformation equations relating the coordinate frames of the electromagnet assembly and the at least one magnetometer;
wherein the step of computing is performed by a microcontroller unit operably connected the at least one magnetometer, and wherein the microcontroller unit controls the measurement of magnetic field vectors by the at least one magnetometer.

* * * * *

UNITED STATES PATENT AND TRADEMARK OFFICE
CERTIFICATE OF CORRECTION

| | |
|---|---|
| PATENT NO. | : 12,072,185 B2 |
| APPLICATION NO. | : 17/506157 |
| DATED | : August 27, 2024 |
| INVENTOR(S) | : Jude L. Sasing and Ramon B. Gustilo |

Page 1 of 1

It is certified that error appears in the above-identified patent and that said Letters Patent is hereby corrected as shown below:

In the Claims

Column 10, Claim 1, Line 58, delete "(Original)".

Signed and Sealed this
Sixteenth Day of December, 2025

John A. Squires
*Director of the United States Patent and Trademark Office*